(12) United States Patent
Bostick et al.

(10) Patent No.: US 8,938,507 B2
(45) Date of Patent: Jan. 20, 2015

(54) INTEGRATED TWO-WAY COMMUNICATIONS BETWEEN DATABASE CLIENT USERS AND ADMINISTRATORS

(75) Inventors: James E. Bostick, Cedar Park, TX (US); Randolph M. Forienza, Austin, TX (US); John P. Kaemmerer, Pflugerville, TX (US); Raghuraman Kalyanaraman, Austin, TX (US); Courtney J. Spooner, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 12/125,204

(22) Filed: May 22, 2008

(65) Prior Publication Data

US 2008/0222264 A1  Sep. 11, 2008

Related U.S. Application Data

(63) Continuation of application No. 11/337,261, filed on Jan. 20, 2006, now abandoned.

(51) Int. Cl.
*G06F 15/16* (2006.01)
*H04L 12/58* (2006.01)

(52) U.S. Cl.
CPC ............. *H04L 12/581* (2013.01); *H04L 51/04* (2013.01)
USPC ............................ 709/206; 709/224; 709/245

(58) Field of Classification Search
USPC .......... 709/224, 206, 245; 707/10, 102, 104.1
See application file for complete search history.

(56) References Cited

U.S. PATENT DOCUMENTS

| 5,761,696 | A | | 6/1998 | Giordano et al. |
| 5,890,148 | A | | 3/1999 | Bhargava et al. |
| 6,058,389 | A | * | 5/2000 | Chandra et al. .................. 707/1 |
| 6,182,075 | B1 | | 1/2001 | Hsu |
| 6,789,112 | B1 | | 9/2004 | Freeman et al. |
| 6,868,544 | B2 | * | 3/2005 | Dalal et al. ..................... 719/318 |
| 6,920,475 | B1 | | 7/2005 | Klots et al. |
| 8,122,115 | B2 | | 2/2012 | Bostick et al. |

(Continued)

FOREIGN PATENT DOCUMENTS

| CN | 1283015 A | 2/2001 |
| JP | 2000010805 | 1/2000 |

OTHER PUBLICATIONS

"SQL Server 2000 quickies [Archive]" by RSINGH, VBFourms ,(Feb. 2002), pp. 2-3.*

(Continued)

*Primary Examiner* — Nicholas Jensen
(74) *Attorney, Agent, or Firm* — Schmeiser, Olsen & Watts, LLP; Mark C. Vallone

(57) ABSTRACT

Embodiments may include receiving a message request to send to one or more recipients, the message request including message content and an indication of the one or more recipients to which the message will be sent. Embodiments may also include determining an Internet Protocol (IP) address associated with each of the one or more recipients based on the message request and transmitting a message to each of the determined IP addresses, where the message includes the received message content. Embodiments may also include receiving a second message from one of the determined IP addresses. Further embodiments may include displaying the second message in a display window. Recipients of messages may include database administrators (DBAs) or database client users.

17 Claims, 7 Drawing Sheets

(56) References Cited

U.S. PATENT DOCUMENTS

| | | | |
|---|---|---|---|
| 8,250,237 | B2 | 8/2012 | Bostick et al. |
| 2002/0049903 | A1 | 4/2002 | Ussery et al. ................. 713/165 |
| 2002/0111986 | A1* | 8/2002 | Wolfson ........................ 709/200 |
| 2003/0131092 | A1* | 7/2003 | McGee et al. ................. 709/224 |
| 2003/0220945 | A1 | 11/2003 | Malik et al. ................... 707/203 |
| 2003/0221023 | A1 | 11/2003 | Peddada et al. .............. 719/330 |
| 2004/0078446 | A1 | 4/2004 | Daniell et al. |
| 2004/0122801 | A1 | 6/2004 | Schirmer et al. |
| 2004/0243851 | A1 | 12/2004 | Lee et al. |
| 2005/0198150 | A1* | 9/2005 | Werner ......................... 709/206 |
| 2006/0053194 | A1* | 3/2006 | Schneider et al. ............ 709/204 |
| 2006/0224404 | A1 | 10/2006 | Keusseyan |
| 2006/0271698 | A1* | 11/2006 | Shrader et al. ................ 709/230 |
| 2007/0162545 | A1* | 7/2007 | Liu et al. ....................... 709/204 |
| 2007/0174395 | A1 | 7/2007 | Bostick et al. |
| 2007/0174417 | A1 | 7/2007 | Bostick et al. |
| 2007/0174477 | A1 | 7/2007 | Bostick et al. |
| 2007/0239755 | A1* | 10/2007 | Mahoney ...................... 707/102 |
| 2008/0215693 | A1 | 9/2008 | Bostick |
| 2008/0222085 | A1 | 9/2008 | Bostick |

OTHER PUBLICATIONS

Frank Kalis, Retriving host IP address via T-SQL, SQLServerCentral.com, Dec. 9, 2004 5:14AM.*

N. Jensen, Non-Final Office Action: mail date Feb. 4, 2009; published by the USPTO in utility U.S. Appl. No. 11/337,262, pp. 14.

N. Jensen, Non-Final Office Action: mail date Jul. 8, 2009; published by the USPTO in utility U.S. Appl. No. 12/061,589, pp. 24.

N. Jensen, Non-Final Office Action; mail date Jan. 23, 2009; published by the USPTO in utility U.S. Appl. No. 11/337,256, pp. 20.

N. Jensen, Final Office Action: mail date Jul. 7, 2009; published by the USPTO in utility U.S. Appl. No. 11/337,256, pp. 18.

N. Jensen, Non-Final Office Action: mail date Feb. 4, 2009; published by the USPTO in utility U.S. Appl. No. 11/337,261; pp. 20.

Certificate of Translation, p. 1.

English Translation of the "Notice of Opinion of First Examination" from the China's Patent Office, dated Jun. 5, 2009, pp. 11.

"Notice of Opinion of First Examination" from the China's Patent Office, dated Jun. 5, 2009, in Chinese, pp. 8.

Non-Final Office Action of U.S. Appl. No. 12/125,148, Jun. 22, 2010, USPTO, Alexandria, VA, USA.

Applicant's attorney Erik J. Osterrieder, Response to Non-Final Office Action of U.S. Appl. No. 12/125,148, Sep. 15, 2010, Austin, TX, USA.

Office Action (Mail Date Nov. 26, 2010) for U.S. Appl. No. 12/125,148, filed May 22, 2008.

James E. Bostick, et al. as Applicants, Amendment Accompanying RCE, mail date Apr. 2, 2010, published by Applicants in utility U.S. Appl. No. 12/061,589, pp. 12.

N. Jensen, Final Office Action; mail date Jan. 5, 2010, published by the USPTO in utility U.S. Appl. No. 12/061,589, pp. 28.

Office Action (Mail Date Jul. 21, 2011) for U.S. Appl. No. 10/863,194, filed May 22, 2008.

SQL Server 2000 quickies [Archive] by RSingh, VBForums (Feb. 2002), pp. 1-3 (PTO8292 for Office Action (mail date Nov. 23, 2011) for U.S. Appl. No. 12/061,589, filed Apr. 2, 2008).

DB Mail 2.5 User Guide, SoftTree Technologies *Jun. 2005), pp. 69-70, 125-134 (PTO892 for Office Action (mail date Nov. 23, 2011) for U.S. Appl. No. 12/061,589, filed Apr. 2, 2008).

Office Action (mail date Nov. 23, 2011) for U.S. Appl. No. 12/061,589, filed Apr. 2, 2008.

Fumie Iwasaki, "Oracle Collaboration Suite 10g", "Advanced functions of Oracle l0g are incorporated, and SOA-compatible flexible workflow and secure content management are implemented", DB Magazine, Japan, Shoeisha. Co., Ltd. Nov. 1, 200, vol. 15, No. 8, pp. 44-47.

Yuji Arakawa, "White-Collar Productivity Improvement Through Oracle Fusion Middleware, Oracle Collaboration Suite 10g", Server Select, Server Solution Magazine, Mediaselect Inc., Oct. 1, 2005, vol. 1, No. 7, pp. 46-55.

Frank Kalis; Retriving host IP address via T-SQL; SQLServerCentral.com, Dec. 9, 2004 5:14AM; Retrieved from the Internet: <URL: http://www.sqlservercentral.com/Forums{TopicI50196-8-I.aspx>; Retrieved on Apr. 3, 2012; 4 pages.

Amendment filed Feb. 17, 2012 in response to Office Action (Mail Date Nov. 23, 2011) for U.S. Appl. No. 12/061,589, filed Apr. 2, 2008.

Notice of Allowance (Mail Date Apr. 12, 2012) for U.S. Appl. No. 12/061,589, filed Apr. 2, 2008.

Amendment filed Mar. 24, 2011 in response to Office Action (Mail Date Nov. 26, 2010) for U.S. Appl. No. 12/125,148, filed May 22, 2008.

Response After Final filed Sep. 21, 2011 in response to Final Office Action (Mail Date Jul. 21, 2011) for U.S. Appl. No. 12/125,148, filed May 22, 2008.

Notice of Allowance (Mail Date Oct. 12, 2011) for U.S. Appl. No. 12/125,148, filed May 22, 2008.

Certificate of Translation, Jul. 14, 2009.

English translation of the "Notice of Opinion of First Examination" from the China's Patent Office, dated Jun. 5, 2009.

"Notice of Opinion of First Examination" from the China's Patent Office, dated Jun. 5, 2009, in Chinese.

* cited by examiner

INTEGRATED TWO-WAY COMMUNICATIONS BETWEEN DATABASE CLIENT USERS AND ADMINISTRATORS

CROSS-REFERENCES TO RELATED APPLICATIONS

Pursuant to 35 USC §120, this continuation application claims priority to and benefit of U.S. patent application Ser. No. 11/337,261, entitled "INTEGRATED TWO-WAY COMMUNICATIONS BETWEEN DATABASE CLIENT USERS AND ADMINISTRATORS", filed on Jan. 20, 2006, the disclosure of which is incorporated herein in its entirety for all purposes.

FIELD OF INVENTION

The present invention is in the field of data processing systems and, in particular, to systems, methods and media for integrated two-way communications between users of a database client and database administrators,

BACKGROUND

Computer systems such as personal computers (PCs), servers, workstations, and mainframes are well known in the art. Computer systems have attained widespread use for providing computing power to many segments of today's modern society. One important function for computer systems is to access, modify, and share information. To accomplish this, information is often stored in a database so that it may be shared among many computer systems. Databases typically have a database manager to facilitate access, manipulation, or storage of the information in the database by other computer systems. The database manager may typically execute on a database server while computer systems using the database may serve as database clients in a client-server relationship. Example database managers include International Business Machine Corporation's (IBM®'s) DB2® database management system, Microsoft Corporation's Microsoft® SQL Server system, Oracle Corporation's Oracle® database management system, or Sybase, Inc.'s® database management system. Database servers and their clients may run on various operating system platforms and database clients (and their applications) communicate with the database server in order to obtain data from the server.

A database administrator (DBA) may be responsible for managing the environmental aspects of a database such as recoverability, resource management, integrity, security, availability, performance, and development and testing support. Database server support commonly offers the ability for the database server to notify the DBA of events (such as table locks) for which the DBA has requested notification as well as sending return codes (such as error, warning or informational codes) to a connected application. Often, a DBA wishes to inform database client users of particular events, such as when the database needs to be taken down or recycled for maintenance, when the database has performance problems, or other occurrences. By informing database client users of the problem (as well as estimated timelines for completion or workarounds), the DBA may provide better service to database clients and reduce the frustration some database client users feel when the database becomes unavailable for reasons unknown to them.

One solution to this problem is to use instant messaging (IM) systems to send messages from the DBA to database client users. This solution, however, suffers from a significant problem in that the DBA must know the IM identity of the database client users who are connected to the database in order to send them an IM message. In a typical large database, the DBA will not know which particular database client users are connected at any given time and therefore cannot effectively send them IM messages. Moreover, DBAs and database client users often change (such as for different shifts) and are often remote, increasing the difficulty of knowing which database client users are presently using the database. Such a solution may also rely on the availability of an IM server to forward the message, as well as both sender and receiver being logged on, further limiting the usefulness of IM.

Another problem is that database client users do not have an effective and efficient mechanism to communicate with a DBA. As database client users often do not know the identity of DBAs, they cannot easily contact the DBAs via phone, e-mail, or IM message. Even if a database client user knows the identity of a DBA, they may not know whether the DBA is on-shift or working from an alternative location, making it more difficult to communicate with the DBA. There is, therefore, a need for an efficient and effective mechanism for providing two-way communication between database client users and administrators.

SUMMARY OF THE INVENTION

The problems identified above are in large part addressed by systems, methods and media for two-way communication between database client users and administrators. Embodiments may include a method for communicating between database client users and administrators. Embodiments may include receiving a message request to send to one or more recipients, the message request including message content and an indication of the one or more recipients to which a message will be sent. Embodiments may also include determining an Internet Protocol (IP) address associated with each of the one or more recipients based on the message request and transmitting a message to each of the determined IP addresses, where the message includes the received message content. Embodiments may also include receiving a second message from one of the determined IP addresses. Further embodiments may include displaying the message in a display window. In some embodiments, the one or more recipients may be a DBA and an IP address of a database server is a determined IP address. In other embodiments, the one or more recipients may be one or more database client users and the determined IP addresses include the IP addresses for one or more database clients. An administrator using the disclosed methodology may accordingly transmit anonymous point-to-point messages to database clients for display to its database client users without having to know the identity, IM address, or other information about the database client users. Similarly, a database client user utilizing the disclosed methodology may transmit point-to-point messages to a database server for display to a DBA.

Another embodiment provides a machine-accessible medium containing instructions effective, when executing in a data processing system, to cause the system to perform a series of operations for communicating between database client users and administrators. The series of operations generally includes receiving a message request to send to one or more recipients, the message request including message content and an indication of the one or more recipients to which a message will be sent. Embodiments may also include a series of operations for determining an Internet Protocol (IP) address associated with each of the one or more recipients based on the message request and transmitting a message to each of the determined IP addresses, where the message includes the received message content. Embodiments may also include a series of operations for receiving a second message from one of the determined IP addresses. Further embodiments may include a series of operations for displaying the message in a display window. In some embodiments, the one or more recipients may be a DBA and an IP address of a database server is a determined IP address. In other embodiments, the one or more recipients may be one or more database client users and the determined IP addresses include the IP addresses for one or more database clients.

A further embodiment provides a database messaging system. The database messaging system may generally include a database client server having a database messaging module. The database messaging module may include a database administrator (DBA) interface module to receive a message request, where the message request includes message content and an indication of one or more database clients to which a message will be sent. The database messaging module may also include an address module to determine an IP address associated with each of the one or more database clients to which a message will be sent and a database messaging transmitter to transmit a message to each determined IP address, where the message may include the message content. Embodiments may also include a database listener to receive a message from a database client. Further embodiments may include one or more database clients in communication with the database server via a network, where each database client includes a client messaging module with a user interface module and an address module to determine an IP address associated with the IP server. The database client may further include a client transmitter to transmit a message to the IP address of the database Server and a client listener for receiving a message from the database server and displaying it to a database client user.

BRIEF DESCRIPTION OF THE DRAWINGS

Advantages of the invention, will become apparent upon reading the following detailed description and upon reference to the accompanying drawings in which, like references may indicate similar elements.

DETAILED DESCRIPTION OF EMBODIMENTS

Figure 1:
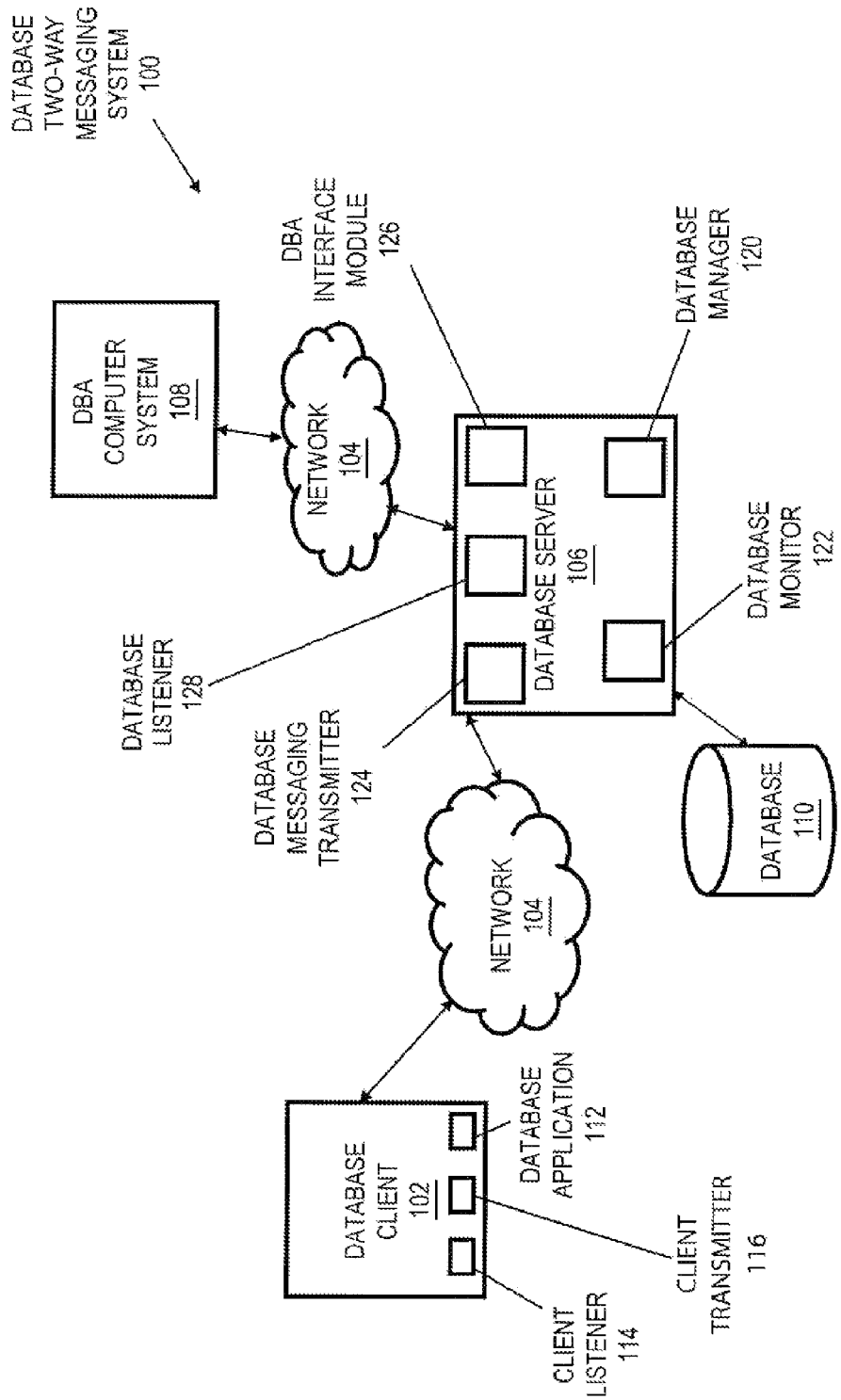
FIG. 1 depicts an environment for a database two-way messaging system with a database server and one or more database clients according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for two-way communication between database client users and an administrator are disclosed. Embodiments may include receiving a message request to send to one or more recipients, the message request including message content and an indication of the one or more recipients to which a message will be sent. Embodiments may also include determining an Internet Protocol (IP) address associated with each of the one or more recipients based on the message request and transmitting a message to each of the determined IP addresses, where the message includes the received message content. Embodiments may also include receiving a second message from one of the determined IP addresses. Further embodiments may include displaying the message in the display window.

The system and methodology of the disclosed embodiments provides for an effective and efficient way of providing communication between a DBA and database client users. By determining the IP address for the database client to which a DBA desires to send a message, the DBA may advantageously send messages to users of the database client without knowing the identity of those database client users. The DBA may accordingly warn database client users of upcoming database interruptions or provide other information just to the database client users who are impacted by the information. In contrast to using an Instant Messaging (IM) system, a DBA using the disclosed methodology need not know the name, e-mail address, IM address, or other information about a database client user and instead the disclosed system may rely on the network address of the database client user's computer (the database client) to provide communication. Similarly, a database client user may also transmit messages to the IP address of the database server, which in turn may then display those to a local DBA or redirect them to a remote DBA. Similar to the DBA, a database client user may communicate with the DBA (including responding to DBA messages) using the disclosed methodology without having to know the DBA's identity, only the IP address of the database server associated with the DBA. The disclosed system also advantageously does not rely on IM or e-mail servers or other external computer systems to perform its task, increasing the robustness of the solution.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for a database two-way messaging system with a database server and one or more database clients according to one embodiment. In the depicted embodiment, the database messaging system 100 includes a plurality of database clients 102 in communication with a database server 106 via a network 104 and a database 110 in communication with the database server 106. An optional database administrator (DBA) computer system 108 may also be in communication with the database server 106 via a network 104. Each database client 102 may include a database application 112 to access the database 110 through the database server 106, Database client 102 may facilitate communications between database client users and the database server 106. The database server 106 may manage communications to and operations with database 110 and may also, as described in more detail subsequently, facilitate communications from a DBA to users of the database clients 102 and from database client users to the DBA.

In the database messaging system 100, any of the database clients 102, the database server 106, the DBA computer system 108s and the database 110 may be located at the same location, such as in the same building or computer lab, or could be remote. While the term "remote" is used with reference to the distance between the components of the database two-way messaging system 100, the term is used in the sense of indicating separation of some sort, rather than in the sense of indicating a large physical distance between the systems. For example, any of the components of the database two-way messaging system 100 may be physically adjacent or located as part of the same computer system in some network arrangements, such as when the database server 106 and DBA computer system 108 are part of the same computer system.

Each database client 102 may include one or more personal computers, workstations, servers, mainframe computers, notebook or laptop computers, desktop computers. PDAs, set-top boxes, mobile phones, wireless devices, or the like. In some embodiments, a database client 102 may be a computer system as described in relation to FIG. 2. The database client 102 may be in wired or wireless communication with network 104. A database client user may utilize a database client 102 and its database application 112 to facilitate the access, viewing, and use of content on database 110 through the use of database server 106. Application 112 may include any type of executable application that accesses database 110, such as an application that uses files from database 110, a word processor, a spreadsheet, business applications (e.g., industry-specific software), a browser, or any other type of application.

Figure 4:
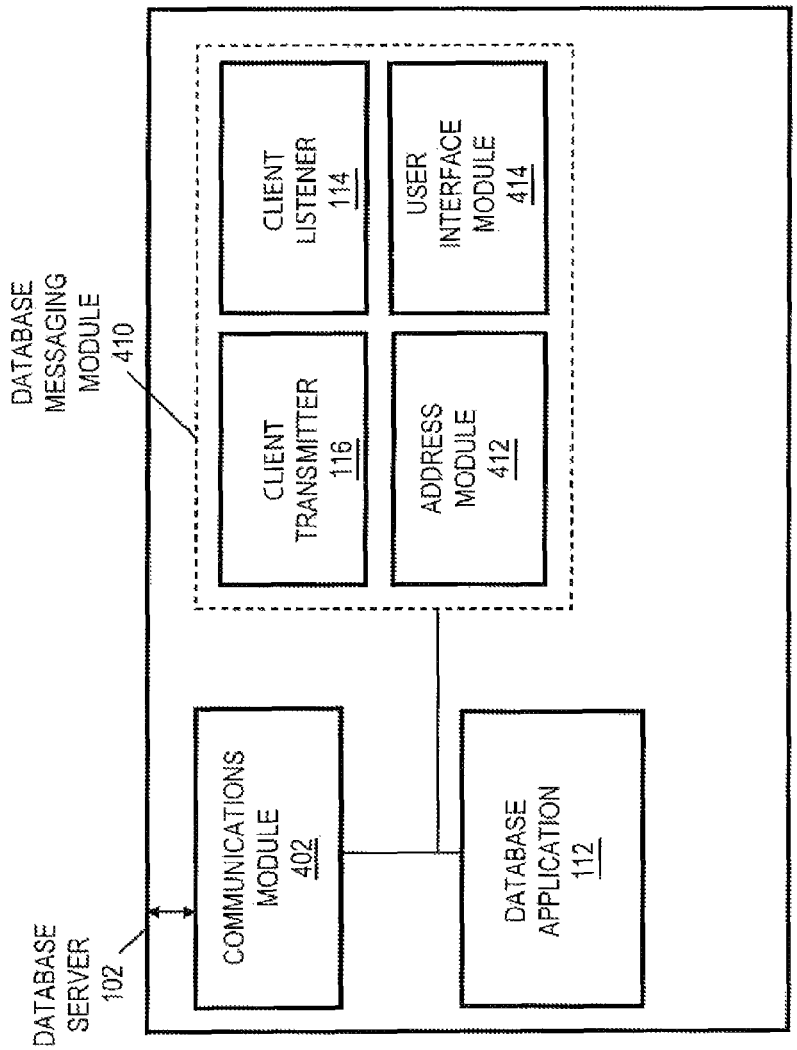
FIG. 4 depicts a conceptual illustration of software components of a database client with a client messaging module according to one embodiment.

Each database client may include a client listener 114 and a client transmitter 116 as part of a client messaging module, as described in more detail in relation to FIG. 4. The client listener 114 may receive messages from the DBA through the database server 106, generate a display window (such as a new window or pop-up window) or utilize an existing window, and display the message to a database client user. As will be described in more detail subsequently, the client listener 114 may monitor a predetermined port and act as a server on the database client 102 machine. The client listener 114 may optionally be incorporated into the database application 112 or any database management software installed on the database client 102. The client transmitter 116 may receive a request to transmit a message to a DBA from a database client user, determine the IP address of the database server 106, and transmit the message to the database server 106, which in turn provides the message to the DBA. The client transmitter 116 may thus act as a client on the database client 102 with respect to the database server 106.

Network 104 may be any type or combination of data communications channel(s), such as the Internet, an intranet, a local area network (LAN), a wide area network (WAN), an Ethernet network, a wireless network, a proprietary network, or a broadband cable network. In one exemplary embodiment, a corporate intranet implemented on a LAN may serve as network 104 for communications between components of a corporate database two-way messaging system 100. Those skilled in the art will recognize, however, that the invention described herein may be implemented utilizing any type of data communications channel or combinations of data communication channels.

The database server 106 provides an interface between database clients 102 and database 110 by facilitating access, manipulation, and storage of information in database 110 by database applications 112 of the database clients 102. The database server 106 may be one or more of any type of computer system, including servers, personal computers, workstations, mainframe computers, notebook or laptop computer, desktop computers, or the like. In some embodiments, the database server 106 may be a computer system as described in relation to FIG. 2. An example database server 106 is an IBM® eServer® server or similar server. In this example, the database server 106 may include software such as IBM®'s DB2® database management system application that provides an effective and robust database platform.

The database server 106 may include modules such as a database manager 120, a database monitor 122, a database messaging transmitter 124, a DBA interface module 126, and a database listener 128. The database manager 120 may a database management system such as IBM®'s DB2® database management system, Microsoft®'s SQL Server system, Oracle®'s database management system, or Sybase, Inc.'s® database management system. The database manager 120 may facilitate access, manipulation, or storage of information in database 110 by database applications 112 of the database clients 102. The database monitor 122 may monitor database 110 activities and may also allow database server support to communicate with the DBA. The database monitor 122 may monitor any type of database 110 activity, such as when records are inserted, updated, or deleted, deadlock of the database 110, or exceeding a predefined threshold for file system size. The database monitor 122 may log these activities and/or notify the DBA upon their occurrence.

Figure 3:
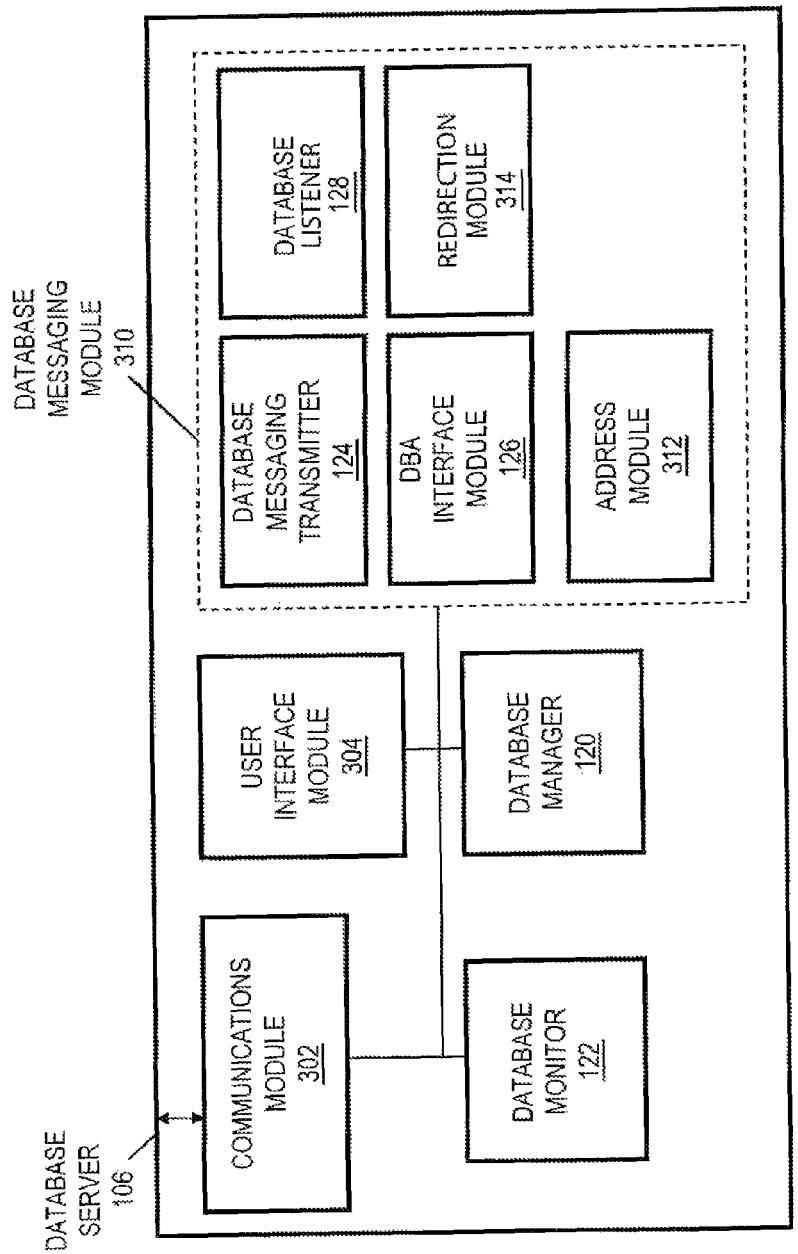
FIG. 3 depicts a conceptual illustration of software components of a database server with a database messaging module according to one embodiment.

The database messaging transmitter 124 and DBA interface module 126 (which may both be part of a database messaging module as described in relation to FIG. 3) may provide for communications between the DBA to users of the database clients 102. The DBA interface module 126 may receive a message request from a DBA or other person to be sent to one or more database client users via their database clients 102. In some embodiments, the DBA interface module 126 provides a graphical user interface (GUI) with which the DBA may input information. The message request may include both message content (including message text, files for attachment, or other information) and an indication of the database client user or users to whom the message should be sent. A DBA or other authorized person may be using a DBA computer system 108, may be directly accessing database server 106, or using another computer system. After receiving the message request, the database messaging transmitter 124 may then transmit a message to the network address (i.e., IP address) for each database client 102. The database messaging transmitter 124 may effectively serve as a client to the client listener 114 of the receiving database clients 102. Database servers 106 generally have access to the IP or other network address for all connected database clients 102 and may advantageously use this IP address to communicate with database client users. By utilizing the IP address of the database client 102, DBAs may advantageously transmit messages to database client users via their database client 102 without having to know the identity, IM address, e-mail address, or other information about the database client users.

The database listener 128 may facilitate communications from users of the database clients 102 to the DBA. The database listener 128 (acting as a server with respect to the client transmitter 116) may receive a message transmitted to an IP address of the database server 106 and intended for a DBA, such as by monitoring one or more ports of the database server 106. The database listener 128 may then display or otherwise provide the message to a DBA that is located with the database server 106, such as by collaborating with the DBA interface module 126 to display the message to the DBA. If a DBA is remote, the database listener 128 may redirect the message to the DBA, such as by transmitting the message to the DBA computer system 108 or to a specified beeper, mobile phone, personal digital assistant (PDA), or other device.

The database 110 may be a collection of related information accessed and managed by a database management system such as database manager 120. Database 110 may be any type of database, such as a hierarchical database or a relational database. Most modern databases are relational databases whose management systems restrict data access to a messaging protocol such as SQL, a nonprocedural language that allows a programmer to specify desired results. Example databases 110 may be consistent with management systems such as IBM®'s DB2® database management system, Microsoft®'s SQL Server system, Oracle®'s database management system, or Sybase, Inc.'s® database management system. The data of database 110 may be stored on one or more storage media such as hard drives, on a storage area network (SAN), tape backup, network attached storage (NAS), or in any other fashion or combination of fashions. An example hardware solution to store a database 110 may be IBM®'s TotalStorage® line of disk storage systems.

Using the disclosed system, a DBA may send messages to individual or blocks of database client users and database client users may likewise communicate with the DBA, providing for an effective and efficient mode of two-way communication between database client users and DBAs. The DBA may select one or more database clients 102 as well as some sort of message, and the database server 106 may then transmit the message to the IP addresses associated with those database clients 102. The database clients 102 for each of those IP addresses may then display the message to their database client users, such as via a pop-up window. A DBA may, for example, notify all database client users who are currently accessing database 110 by specifying the database name before recycling the database 110 so that the database client users know the reason for the outage and how long it is scheduled to last. By selecting a plurality of database clients 102 and database client users with a database name, the DBA may effectively broadcast a message to all of those database client users. Under previous systems, a database client user may not know why the database 110 was down or for how long it might be down, resulting in a frustrating experience. Similarly, if a DBA noticed that a particular database client 102 at a particular IP address was locking database server 106 resources and causing system performance to slow, the DBA could inform the database client users before terminating the database client user's application or with a recommendation for corrective action. For these and other examples, the DBA need not know the identity of the database client user and instead may rely on the client IP address maintained by the database server 106.

A database client user may similarly use the disclosed system to communicate with a DBA for a database they are using without having to know the identity of the DBA. A database client user may initiate the communication with the DBA or respond to communications from the DBA. For example, a database client user experiencing poor connection times or other poor performance may communicate with the DBA to determine if a system-wide problem is causing the problems or to determine a solution. In another example, a database client user who receives a notice from the DBA that the database 110 will be unavailable in ten minutes may respond to the message to tell the DBA that a mission-critical application 112 is using the database 110 and to request a delay in the planned shut-down. The message from the database client user may be displayed to the DBA wherever they are located in some embodiments by providing for redirection capability for remote DBAs.

Components of the database two-way messaging system 100, such as the client listener 114 and client transmitter 116 of the database client 102 and the database listener 128 and database messaging transmitter 124 of the database server 106, may be installed with the database or installed at a later time, such as part of an upgrade or a separate module.

Figure 2:
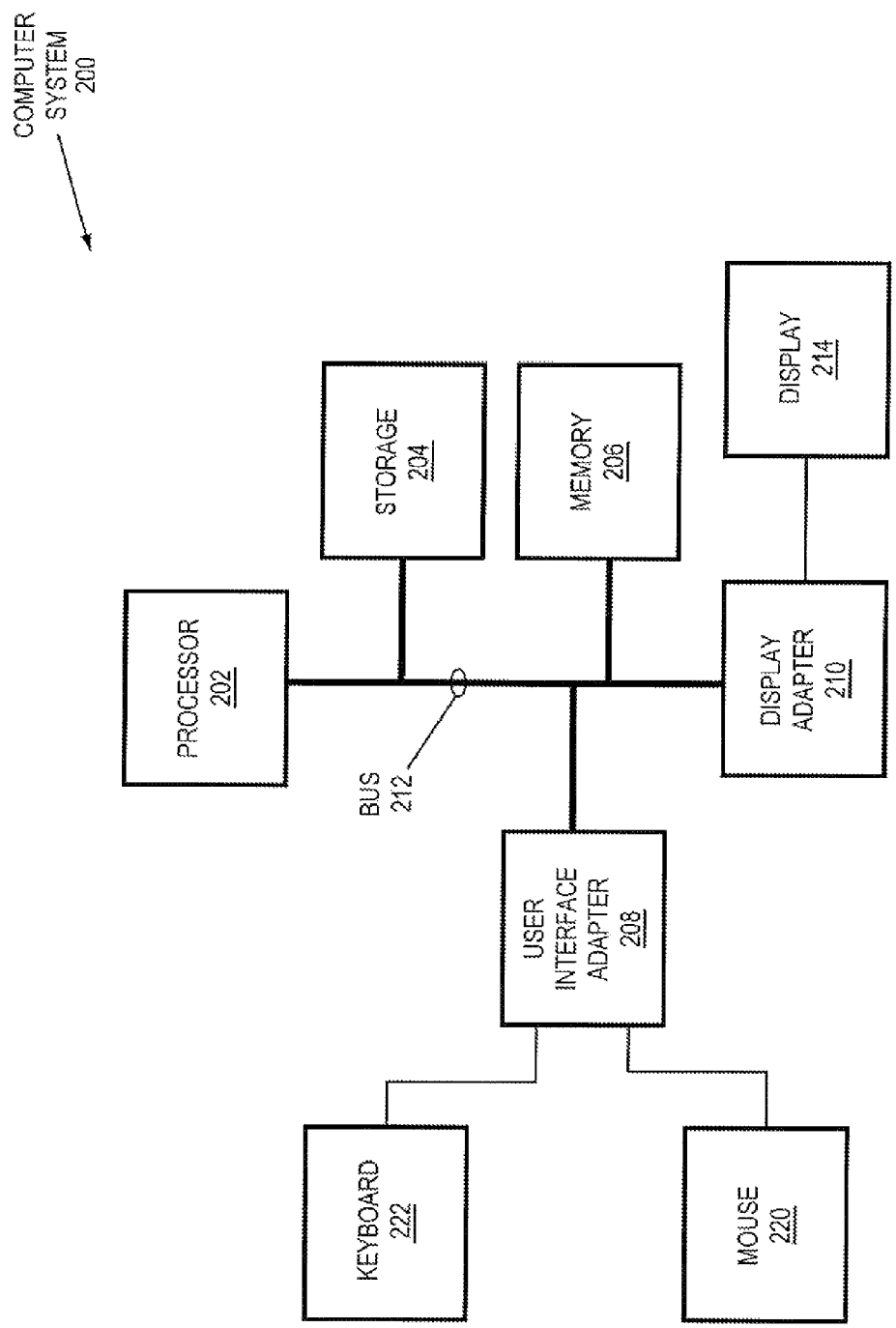
FIG. 2 depicts a block diagram of one embodiment of a computer system suitable for use as a component of the database two-way messaging system.

FIG. 2 depicts a block diagram of one embodiment of a computer system 200 suitable for use as a component of the database two-way messaging system 100, such as a database client 102, a database server 106, or a DBA computer system 108. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor, or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 of keyboard 222. The user interface adapter 208 may also connect with other types of user input devices, such as touch pads, touch sensitive screens, electronic pens, microphones, etc. A DBA may utilize the user interface devices of a DBA computer system 108, for example, to input message text and to submit a message request. Similarly, a database client user may input a desired message using the keyboard 222 of a database client 102. The bus 212 may also connect the processor 202 to a display 214, such as an LCD display or CRT monitor, via the display adapter 210. A database client 102 that receives a message from the database server 106, or a database server 106 that receives a message from a database client 102, may display that message in a window of display 214 in some embodiments.

FIG. 3 depicts a conceptual illustration of software components of a database server with a database messaging module according to one embodiment. The database server 106 of the depicted embodiment includes a database manager 120, a database monitor 122, a communications module 302, a user interface module 304, and a database messaging module 310. The database messaging module 310 may include sub-modules such as a database messaging transmitter 124, a DBA interface module 126, a database listener 128, an address module 312, and a redirection module 314. The database manager 120, database monitor 122, database messaging transmitter 124, DBA interface module 126, and database listener 128 are described in relation to FIG. 1 and the description will not be repeated for the sake of brevity.

The communications module 302 may facilitate communications to and from the database server 106 via network 104, such as communications with database clients 102 or the DBA computer system 108. The user interface module 304 may receive user input from user input devices such as a mouse 220 or keyboard 222 and may also provide output to a user, such as via a display 214 or speaker.

The database messaging module 310 and its components may receive message requests from a DBA to be sent to one or more database clients 102, determine the IP addresses associated with the database clients 102, and transmit a message to those IP addresses. The database messaging module 310 and its components may also receive messages transmitted from database clients 102 and display or otherwise provide those messages to DBAs. As described previously, the DBA interface module 126 may receive the message request that includes message content and an indication of one or more database clients 102 to which the message will be sent. The DBA interface module 126 may also provide a GUI of text display of a received message to the DBA.

When the database messaging module 310 is transmitting a message, the address module 312 may determine an IP address associated with each of the one or more database clients 102 to which a message will be sent, after which the database messaging transmitter 124 may transmit the message to the determined IP addresses. As described previously, database servers 106 generally have access to the IP or other network address for all connected database clients 102. The address module 312 may determine the IP addresses in a number of fashions. If a DBA submits a list of one or more IP addresses, the address module 312 may simply use those IP addresses (after optionally converting them to decimal format). If the DBA specifies a database name, the address module 312 may determine all of the IP addresses currently active with or associated with that database. If a particular database client 102 is connected more than once to the same database 110, duplicate IP addresses may be eliminated. By allowing the DBA to specify a database name, the DBA may effectively broadcast a message to all connected database clients 102 without having to specify each individually. The address module 312 may use any methodology to translate the indication of database clients 102 received from the DBA to a list of one or more IP addresses.

When the database messaging module 310 is receiving a message, the database listener 128 may receive such message from a database client 102 by monitoring one or more ports of the database server 106 or other methodology. The redirection module 314 may provide additional flexibility in providing the content of the message to a DBA. If a DBA is local (i.e., with the database server 106), the DBA interface module 126 may display the message to the DBA, as described previously. The redirection module 314 may transmit the message to another device that the DBA is using when a DBA is remote from the database server 106. A DBA may provide to the redirection module 314 preferences for desired locations to receive a forwarded or redirected message, such as the DBA's beeper, mobile phone, a DBA computer system 108, PDA, etc. By providing for redirection of messages to a DBA, the redirection module 314 of the database client 106 may efficiently ensure that a DBA receives a message from a database client user.

FIG. 4 depicts a conceptual illustration of software components of a database client with a client messaging module according to one embodiment. The database client 102 of the depicted embodiment includes a database application 112, a communications module 402, and a client messaging module 410. The client messaging module 410 may include sub-modules such as a client listener 114, a client transmitter 116, an address module 412, and a user interface module 414. The database application 112, client listener 114, and client transmitter 116 are described in relation to FIG. 1 and the description will not be repeated for the sake of brevity.

The communications module 402 may facilitate communications to and from the database client 102 via network 104, such as communications with database server 106. The client messaging module 410 and its components may receive message requests from a database client user to be sent to the DBA, determine the IP addresses associated with the database server 106, and transmit a message to that IP address. The client messaging module 410 and its components may also receive messages from a DBA through the database server 106 and may then display or otherwise provide the message to the user of the database client 102. The client listener 114 and client transmitter 116 may provide for receipt and transmission of messages, respectively, for the client messaging module 410.

The address module 412 of the client messaging module 410 may determine an IP address associated with the database server 106, after which the client transmitter 114 may transmit the message to the determined IP address. The address module 412 may determine the IP address in any fashion, such as requesting the IP address of the database server 106 from the database application 112, which may need such information to provide access to database 110. Database clients 102 generally have access to the IP or other network address for the database server 106 with which they are connected. The user interface module 414 may receive user input from user input devices such as a mouse 220 or keyboard 222 and may also provide output to a database client user, such as via a display 214 or speaker. When the client messaging module 410 receives a message, for example, the user interface module 414 may display the message using display 214. A user may utilize a GUI or text interface of the user interface module 414 to view a message, input a new message, reply to a message, or request transmission of a message.

Figure 5:
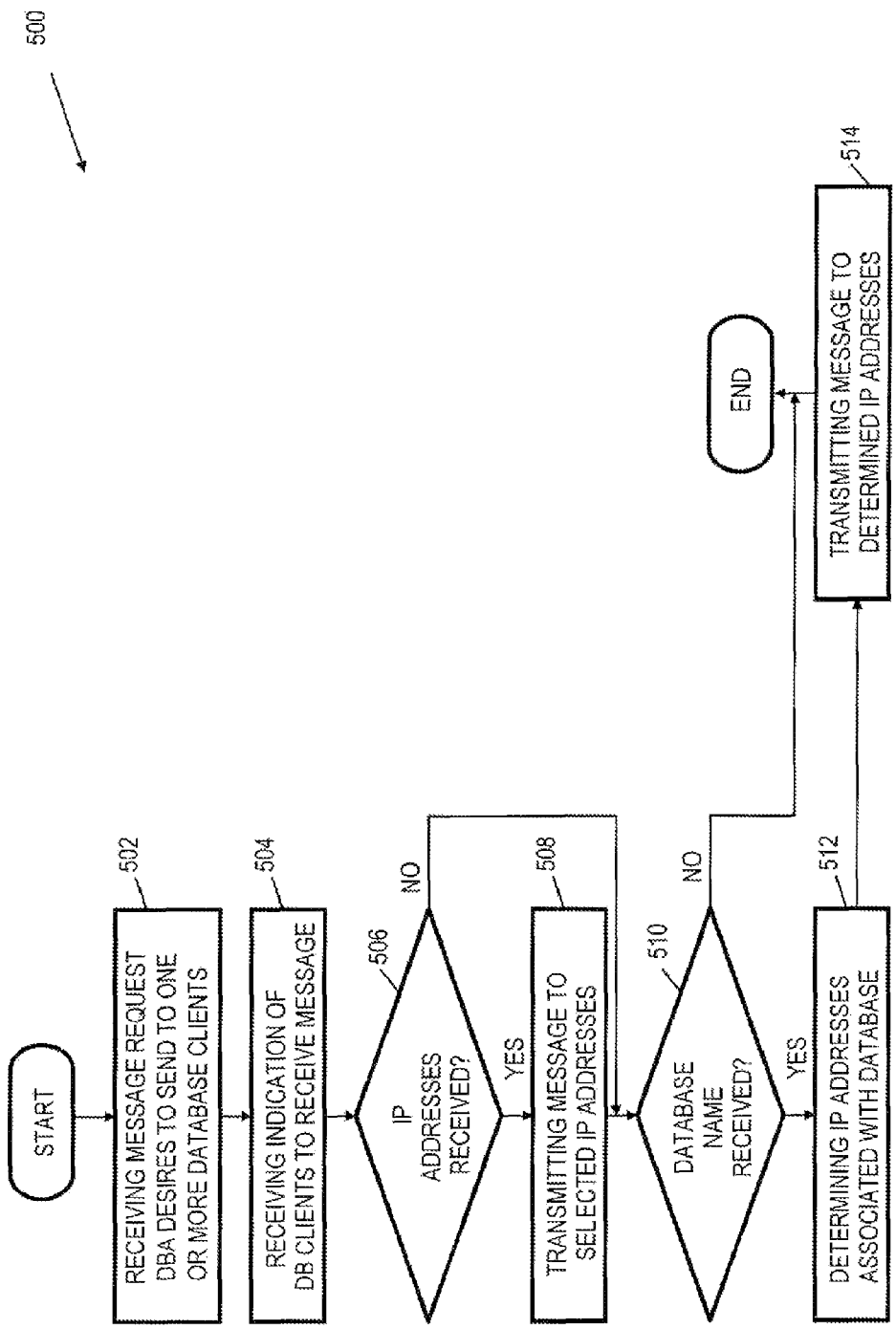
FIG. 5 depicts an example of a flow chart for receiving a message request and transmitting a message to one or more database clients according to one embodiment.

FIG. 5 depicts an example of a flow chart for receiving a message request and transmitting a message to one or more database clients according to one embodiment. In one embodiment, components of a database server 106 such as the database messaging module 310 and its components may perform the elements of flow chart 500. In the depicted embodiment, flow chart 500 begins with element 502, where the DBA interface module 126 of the database messaging module 310 may receive a message request from the DBA or other authorized person that includes message content that the DBA desires to send to one or more database clients 102 and/or database client users. As described previously, the DBA interface module 126 may receive the message request from a DBA computer system 108 or from a DBA directly accessing the database server 106. As part of the receiving the message request, the DBA interface module 126 may also receive an indication of the one or more database clients 102 to receive the message at element 504. The indication of database clients 102 to receive the message may be a list of IP addresses for the database clients 102, a database name, or other indication or combination of indications. In some embodiments, the message request may include both the message content (e.g., message text, file attachments) and the indication of database clients 102.

After receiving the message request (with its indication of database clients 102), the address module 312 of the database messaging module 310 may determine the IP addresses associated with the database client 102 indications. At decision block 506, the address module 312 may determine whether one or more IP addresses were received as the database client 102 indications. If IP addresses were received, the address module 312 may determine the IP addresses for the messaging recipients by converting those IP addresses as necessary, such as by converting them to the decimal format. The database messaging transmitter 124 may then transmit the message (based on the message content) to the selected IP addresses at element 508. At decision block 510, the address module 312 may determine whether one or more database names were received as part of the database client 102 indication. If a database name was received, the method of flow chart 400 continues to element 512, where the address module 312 may determine the IP addresses associated with the database name, such as by cross-referencing the database name with a list of IP addresses currently accessing that database. The address module 312 may also eliminate duplicate IP addresses that may occur when a database client 102 is logged in multiple times. The database messaging transmitter 124 may then transmit the message to the determined IP addresses at element 514, after which the method terminates.

While the database messaging transmitter 124 is depicted as potentially transmitting a message separately at elements 508 and 514, some or all of the transmission may be combined into one transmission before termination of method 500. Moreover, the received indication of one or more database clients 102 received as part of the message request may include a plurality of different methods for indicating database clients 102. For example, a message request may include a list of three IP address as well as a database name. In this example, after all the relevant IP addresses are determined by the address module 312, the database messaging transmitter 124 may transmit the message to all IP addresses simultaneously if so desired.

Figure 6:
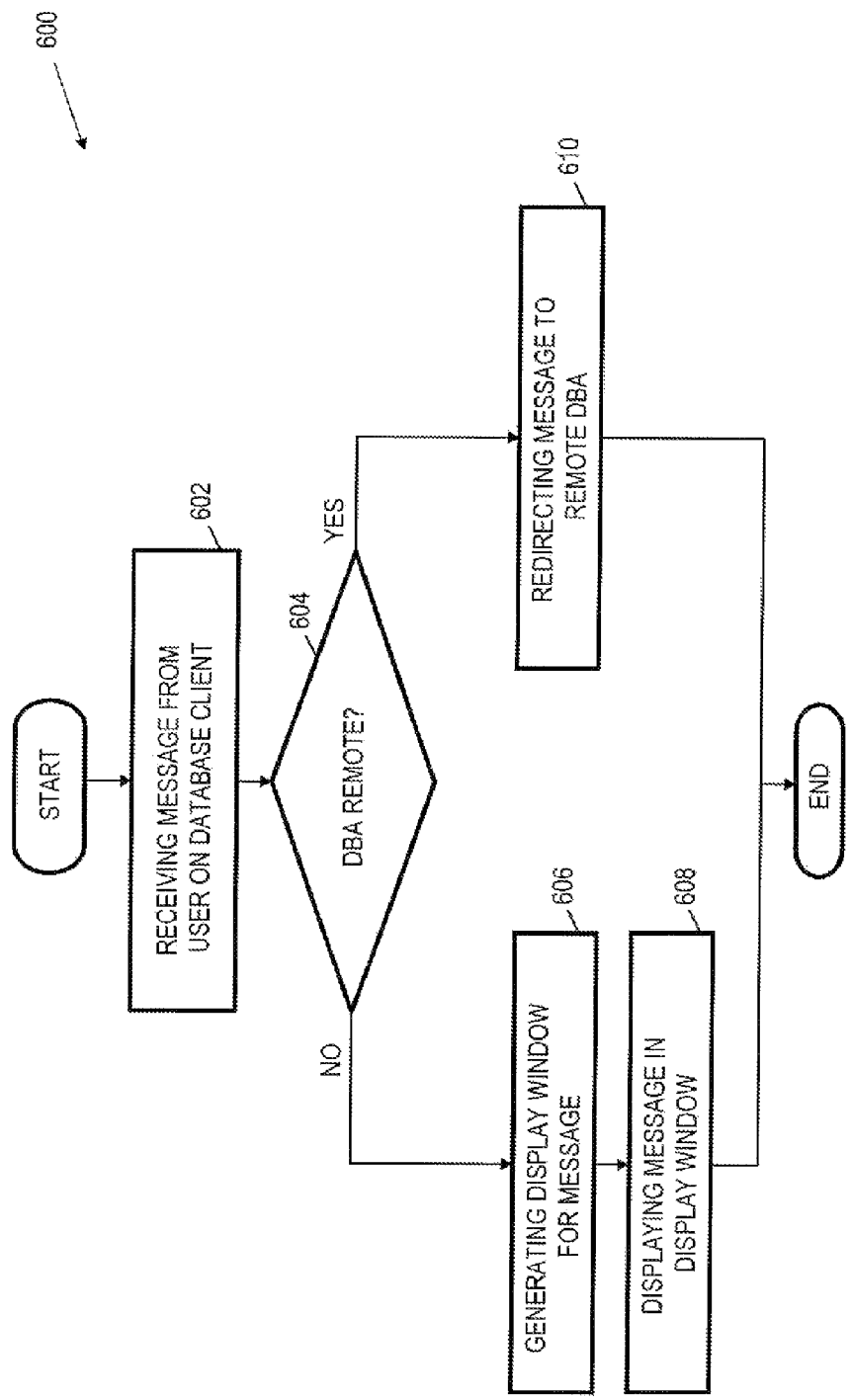
FIG. 6 depicts an example of a flow chart for receiving a message and providing the message to a DBA according to one embodiment.

FIG. 6 depicts an example of a flow chart for receiving a message and providing the message to a DBA according to one embodiment. In one embodiment, components of a database server 106 such as the database messaging module 310 and its components may perform the elements of flow chart 600. The method of flow chart 600 may be performed, for example, when database client users respond to a DBA-transmitted message or when a database client user sends a message to the DBA to report a problem or for other reasons. In the depicted embodiment, flow chart 600 begins with element 602, where the database listener 128 may receive a message from a database client user (through a database client 102). At decision block 604, the method of flow chart 600 may determine whether one or more DBAs are at remote locations where they desire to receive user messages. A DBA may input such preferences using the DBA interface module 126. If at least one DBA is local to the database server 106, the method may display the message at a display 214 of the database server 106 so that the local DBA may see the message. At element 606, the database listener 128 may optionally generate a display window for the message, such as by creating such a display window or requesting another application to do so. A display window may be, for example, any aspect of a GUI that allows a message to be displayed such as a browser instantiation, a pop-up window, a text window, etc. Alternatively, the database listener 128 may utilize an existing window, such as a window created as part of an ongoing conversation between a DBA and database client user. The database listener 128 may then, at element 60S, display the message in the generated display window, allowing the DBA to view the message, after which the method terminates. In some embodiments, the display window may preempt other items on display 214 so that the DBA is more likely to see the message.

If one or more DBAs are remote, the method of flow chart 600 continues to element 610, where the redirection module 314 redirects the received message to the remote DBA, after which the method terminates. The location of the remote DBA may be known as the alternative DBA address, and may be an e-mail address, phone or beeper number, IP address or other address. The DBA may configure the redirection module 314 to redirect the message to a DBA computer system 108, mobile phone, beeper, PDA, or any other device so that they may receive user messages without being at the database server 106. The message may be displayed on the DBA's device in any fashion, such as on a mobile phone display screen, etc. While displaying the message to a local DBA and redirecting the message to a remote DBA are depicted as alternatives, one skilled in the art will recognize that the two notification procedures may be combined in any fashion. A DBA, for example, may desire to have a message displayed at the database server 106 and also redirected to their beeper so that she always receives messages. Messages may be displayed to multiple DBAs, in another example, by duplicating and redirecting the message to their appropriate addresses (in addition to local display).

Figure 7:
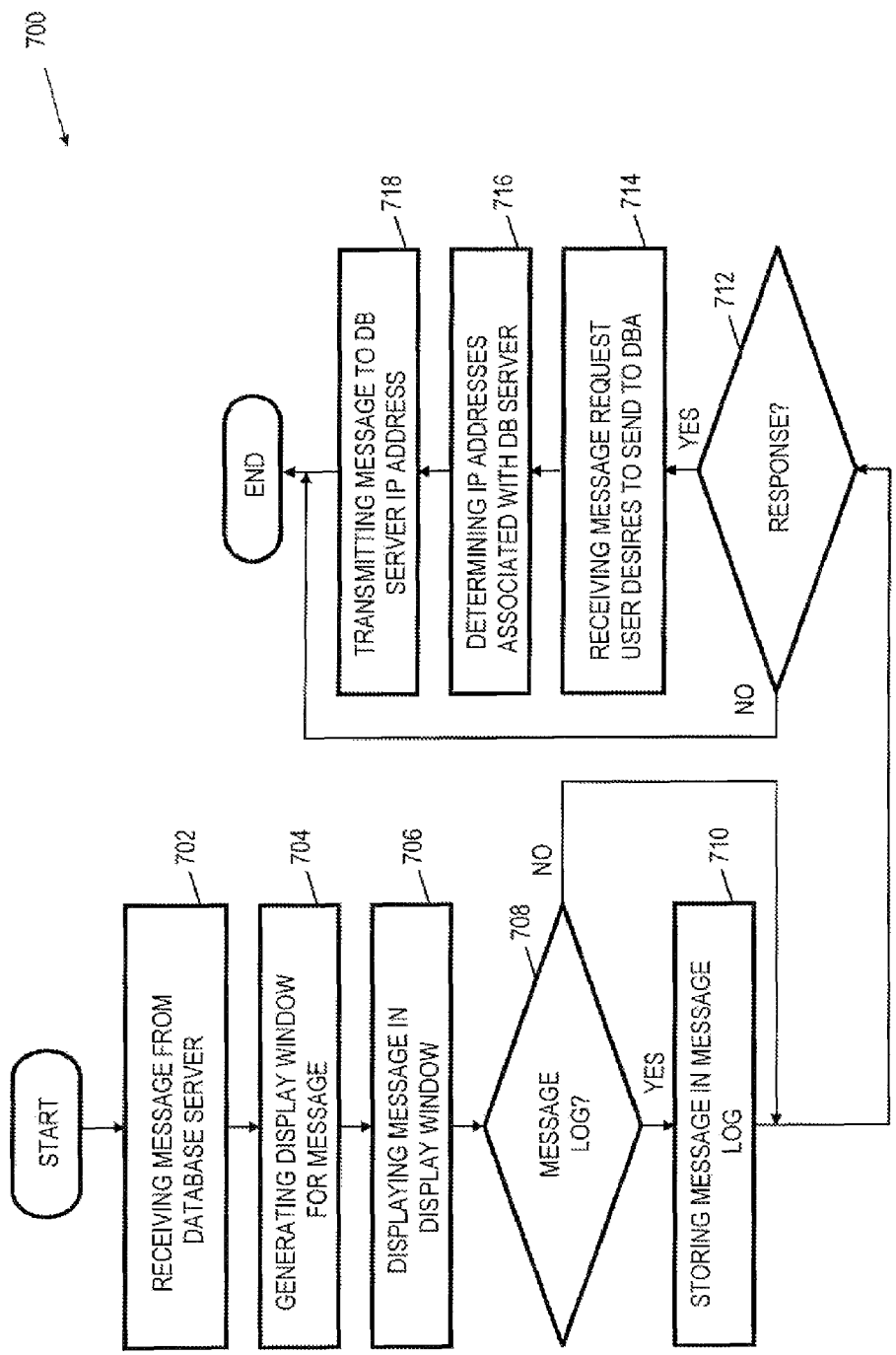
FIG. 7 depicts an example of a flow chart for receiving a message from a database server, displaying the message to a database client user, and transmitting a message to a DBA according to one embodiment.

FIG. 7 depicts an example of a flow chart for receiving a message from a database server, displaying the message to a database client user, and transmitting a message to a DBA according to one embodiment. In one embodiment, components of a database client 102 may perform the elements of flow chart 700. In the depicted embodiment, flow chart 700 begins with element 702, where the client listener 114 of a database client 102 may receive a message from the database server 106. The database client 102 executing the client listener 114 has an IP address matching one of the IP addresses determined by the address module 312 as described in relation to FIG. 5. As described previously, the client listener 114 may listen on a specified or pre-determined port of the database client 102 for the message. In doing so, the client listener 114 may act as the server on the database client 102 with respect to the database messaging transmitter 124.

After receiving the message, the client listener 114 may optionally generate a display window for the message at element 704, such as by creating such a display window or requesting another application to do so. A display window may be, for example, any aspect of a graphical user interface (GUI) that allows a message to be displayed such as a browser instantiation, a pop-up window, a text window, etc. Alternatively, the client listener 114 may utilize an existing window, such as in the case of repeated messages from a DBA or an ongoing conversation. The client listener 114 may then, at element 706, display the message in the display window, allowing a user of the database client 102 to view the message from the DBA. In some embodiments, the display window may preempt other, items on the database client user's display 214 so that they are more likely to see the message. The client listener 114 may also optionally determine whether to save the message in a message log at decision block 708. If the message will be saved, the client listener 114 may store the message in a message log at element 710.

In some embodiments, the database client user may desire to send a message to the DBA, such as to report a problem or to respond to a message received at element 702. If it is determined at decision block 712 that no message is to be sent, the method of flow chart 700 may terminate. If a message is to be sent, the method continues to element 714, where the user interface module 414 of the client messaging module 410 may receive a message request that the database client user desires to send to the DBA. The message request may include message content such, as text, files, etc., as well as an indication of an intention to send the message to a DBA. The address module 412 may determine the IP address associated with the database server 106 at element 716, such as by requesting such information from the application 112 or from detection when receiving a message. The client transmitter 116 may then, at element 718, transmit the message to the database server IP address for display or redirection to the DBA, after which the method terminates.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for two-way communication between database client users and administrators. It is understood that the form of the invention shown and described in the detailed description and the drawings are to be taken merely as examples. It is intended that the following claims be interpreted broadly to embrace all the variations of the example embodiments disclosed.

What is claimed is:

1. A method for communicating between database client users and administrators, said method comprising:
a processor of a computer system receiving, from a database administrator (DBA) responsible for managing environmental aspects of a particular database, a message request comprising a database name of the particular database, at least two message recipients, and message content, said message request being a request to send the message content only to the at least two message recipients consisting of at least two but not all database client users currently connected to the particular database, wherein a first message differing from the message request and comprising the message content will be sent to only the at least two message recipients without including in the first message identification of any specific users of the particular database, said message content selected from the group consisting of message text, at least one file attachment, and a combination thereof;
said processor determining an Internet Protocol (IP) address associated with each message recipient, without using an instant messaging address for any of the message recipients, by cross-referencing the at least two message recipients with a list of IP addresses currently maintained by a database server accessible to the DBA;
after said determining the IP address associated with each message recipient, said processor simultaneously transmitting the first message comprising the message content to each of the determined IP addresses; and
said processor receiving a second message from one IP address of the determined IP addresses to which the first message was transmitted, said second message comprising a reply message to the first message from a database client user.

2. The method of claim 1, said method further comprising said processor initiating display of the second message in a display window.

3. The method of claim 2, said method further comprising before initiating display of the second message in the display window, said processor generating the display window.

4. The method of claim 1, said method further comprising said processor redirecting the second message to an alternative database administrator (DBA) address.

5. The method of claim 1, said method further comprising said processor storing the second message in a message log.

6. The method of claim 1, wherein the environmental aspects of the particular database comprise recoverability, resource management, integrity, security, availability, performance, and development and testing support.

7. A machine-accessible storage device comprising program instructions configured to be executed by a processor of a computer system to perform a method for communicating between database client users and administrators, said method comprising:
said processor receiving, from a database administrator (DBA) responsible for managing environmental aspects of a particular database, a message request comprising a database name of the particular database, at least two message recipients, and message content, said message request being a request to send the message content only to the at least two message recipients consisting of at least two but not all database client users currently connected to the particular database, wherein a first message differing from the message request and comprising the message content will be sent to only the at least two message recipients without including in the first message identification of any specific users of the particular database, said message content selected from the group consisting of message text, at least one file attachment, and a combination thereof;
said processor determining an Internet Protocol (IP) address associated with each message recipient, without using an instant messaging address for any of the message recipients, by cross-referencing the at least two message recipients with a list of IP addresses currently maintained by a database server accessible to the DBA;
after said determining the IP address associated with each message recipient, said processor simultaneously transmitting the first message comprising the message content to each of the determined IP addresses; and said processor receiving a second message from one IP address of the determined IP addresses to which the first message was transmitted, said second message comprising a reply message to the first message from a database client user.

8. The storage device of claim 7, said method further comprising initiating display of the second message in a display window.

9. The storage device of claim 7, said method further comprising redirecting the second message to an alternative database administrator (DBA) address.

10. The storage device of claim 7, said method further comprising storing the second message in a message log.

11. The storage device of claim 7, wherein the environmental aspects of the particular database comprise recoverability, resource management, integrity, security, availability, performance, and development and testing support.

12. A computer system comprising a processor and a computer readable storage device coupled to the processor, said storage device containing program instructions configured to be executed by the processor to implement a method for communicating between database client users and administrators, said method comprising:

said processor receiving, from a database administrator (DBA) responsible for managing environmental aspects of a particular database, a message request comprising a database name of the particular database, at least two message recipients, and message content, said message request being a request to send the message content only to the at least two message recipients consisting of at least two but not all database client users currently connected to the particular database, wherein a first message differing from the message request and comprising the message content will be sent to only the at least two message recipients without including in the first message identification of any specific users of the particular database, said message content selected from the group consisting of message text, at least one file attachment, and a combination thereof;

said processor determining an Internet Protocol (IP) address associated with each message recipient, without using an instant messaging address for any of the message recipients, by cross-referencing the at least two message recipients with a list of IP addresses currently maintained by a database server accessible to the DBA;

after said determining the IP address associated with each message recipient, said processor simultaneously transmitting the first message comprising the message content to each of the determined IP addresses; and said processor receiving a second message from one IP address of the determined IP addresses to which the first message was transmitted, said second message comprising a reply message to the first message from a database client user.

13. The computer system of claim 12, said method further comprising said processor initiating display of the second message in a display window.

14. The computer system of claim 13, said method further comprising before initiating display of the second message in the display window, said processor generating the display window.

15. The computer system of claim 12, said method further comprising said processor redirecting the second message to an alternative database administrator (DBA) address.

16. The computer system of claim 12, said method further comprising said processor storing the second message in a message log.

17. The computer system of claim 12, wherein the environmental aspects of the particular database comprise recoverability, resource management, integrity, security, availability, performance, and development and testing support.

* * * * *